Nov. 29, 1949 A. M. SHIPLEY 2,489,727
HAND CONTROL ACCELERATOR FOR AUTOMOBILES
Filed July 23, 1948
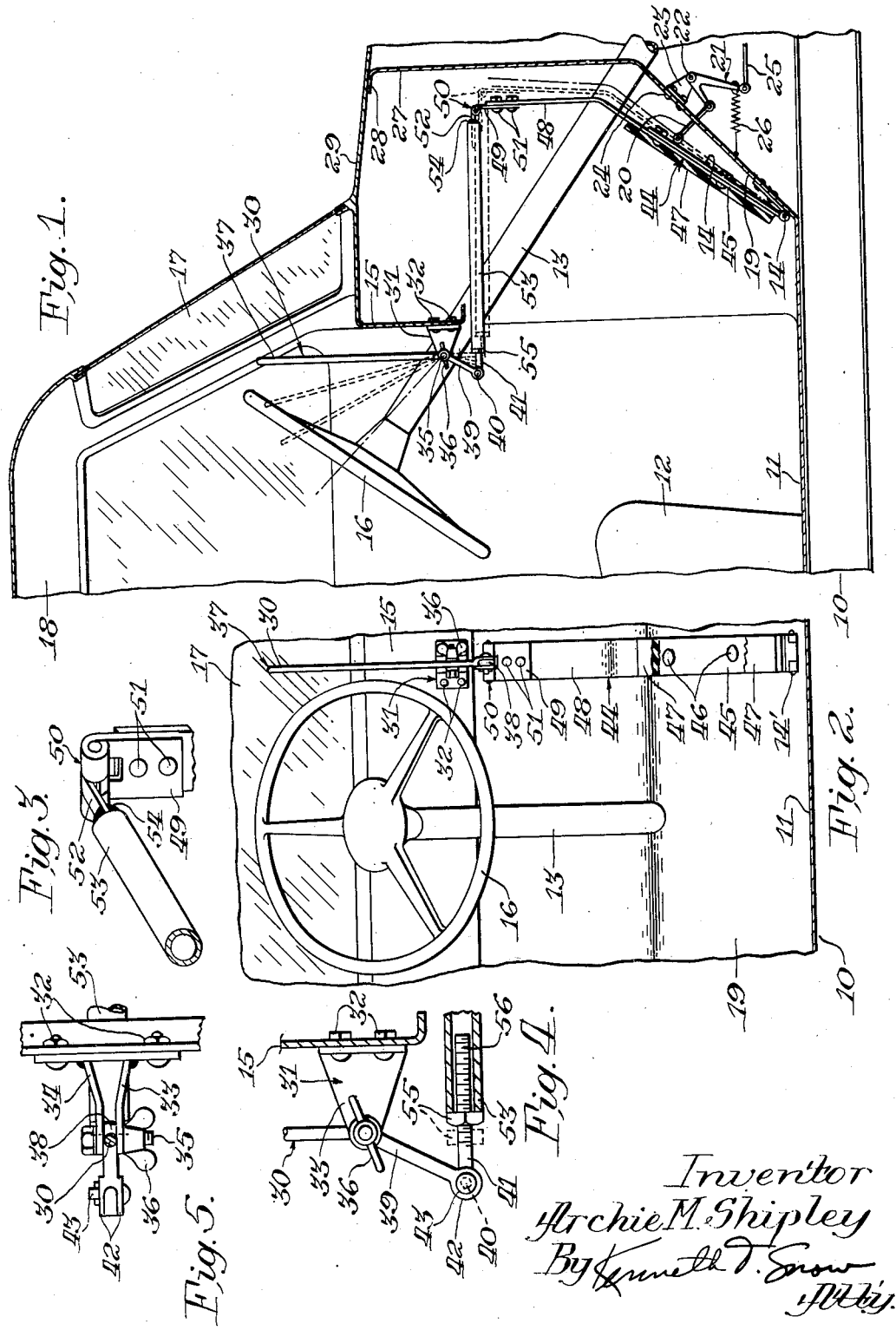
Inventor
Archie M. Shipley
By Kenneth T. Snow
Atty.

Patented Nov. 29, 1949

2,489,727

UNITED STATES PATENT OFFICE 2,489,727

HAND CONTROL ACCELERATOR FOR AUTOMOBILES

Archie M. Shipley, Chicago, Ill.

Application July 23, 1948, Serial No. 40,293

3 Claims. (Cl. 74—482)

1

This invention relates to a new and improved hand control accelerator for automobiles.

The present day automobiles are built with foot control accelerator pedals and as a rule no hand throttle is provided. Certain automobiles do provide a semblance of a hand accelerator positioned on the dash panel, but they are inadequate for successful use as a hand operated accelerator and throttle. The need exists for a hand control accelerator which will be conveniently located to the operator's hands and which will not be in the way of gear shift levers or other mechanisms and which will be readily attachable to the present foot pedal accelerator so that complicated attaching mechanisms to the throttle valve of the carburetor are not necessary.

An important object of the present device is to provide a hand operated accelerator located adjacent the operator's hand in the vicinity of the steering wheel of an automobile.

Another important object of this invention is to provide a hand control accelerator which is readily attached to the existing foot pedal accelerator.

Another and still further object of this invention is the provision of a hand control accelerator and throttle attachment for automobiles which will permit operation of the throttle valve by either the foot pedal accelerator or the hand operated accelerator.

Still another important object of this invention is the provision of a hand lever throttle control which may be operated for continuously variable speeds of the automobile or which may be set at any desired speed.

Another and still further important object is to provide a simple, compact unit capable of attachment to the present existing foot pedal accelerator of automobiles to provide a hand control accelerator lever which will be simply and conveniently operated by the driver of the automobile.

Still another object of this invention is the universal adaptability of the hand control throttle of this invention to the foot pedal throttle control of any automobile.

A further object of the invention is to provide a hand controlled accelerator for automobiles which may be conveniently adjusted so that by manual operation thereof it will take over the control from the standard foot pedal accelerator at any desired position in its range of movement.

Other and further important objects of this invention will become apparent from the disclosures in the following specification and accompanying drawings.

In the drawings:

Figure 1 is a side elevational view partially in section of the interior of an automobile showing the hand control accelerator of this invention.

Figure 2 is a front elevational view of the device as shown in Figure 1.

Figure 3 is an enlarged perspective view of a portion of the connecting linkage between the foot pedal accelerator and the hand lever control.

Figure 4 is a side elevational view partially in section of the attachment of the hand control mechanism to the automobile dash panel.

Figure 5 is a top plan view of the device as shown in Figure 4.

As shown in the drawings:

The reference numeral 10 indicates generally the body of an automobile, having a floor portion 11, a front seat 12, a steering column 13, a foot pedal accelerator and throttle control 14, a dash panel 15, a steering wheel 16, a windshield 17, and a roof 18. The foot pedal accelerator 14 is hinged at 14' on an upwardly and forwardly inclined wall or partition member 19 forming a continuation of the floor 11. Depression of the hinged pedal 14 causes the arm member 20 to swing a bell crank lever 21 about a pivot 22 on a bracket 23 fastened to the inclined partition 19 at 24 by rivets or bolts or the like. A connecting link 25 is joined to the bell crank lever 21 and projects forwardly to a carburetor and throttle valve or the like (not shown). A spring 26 extending between the bell crank member 21 and the inclined floor panel or partition 19 is arranged to provide resiliency to the foot pedal and holds it in a normal up or throttle position. A vertical partition 27 forms an integral part of the partition 19 and is fastened at 28 to an engine hood 29 of the automobile. The partition 19—27 separates the passenger compartment and engine compartment.

A hand control accelerator lever 30 is positioned adjacent the steering wheel 16 so that an operator or driver may manipulate the hand lever 30 while retaining his grip on the steering wheel. A bracket member 31 is fastened to the dash panel 15 at 32 by bolts or rivets or the like. This construction is shown in the enlarged views of Figures 4 and 5. As best shown in Figure 5 the bracket 31 is equipped with horizontally spaced vertical side plates 33 and 34 having horizontally aligned apertures. The hand lever 30 is held and pivoted on a transverse axis defined by a bolt member 35 between the bracket side plates 33 and 34. A winged nut 36 is adapted to draw up on the bolt 35 and pull the plate members 33 and 34 together causing the lever 30 to be more or less tightly held therebetween. The hand lever 30 is equipped with a hand engaging portion 37, a central relatively flat apertured disk portion 38, and a downwardly and rearwardly extending portion 39. The central flat disk-like portion 38 has a central aperture for the reception of the bolt 35. The bracket members 33 and 34 are compressed against the flat disk portion 38 giving considerable surface for frictional engagement between the hand lever 30 and the bracket 31. The downwardly and rearwardly inclined portion 39 of the hand lever 30 is pivotally joined at 40 to a forwardly extending link or piston 41. As best shown in Figure 5 the lower end 39 of the lever arm 30 is formed as a clevis 42 for the reception of the end of the forwardly extending link or piston 41. A pin 43 passes transversely through the clevis 42 and the piston 41, providing for pivotal connection therebetween.

In order to supply the hand lever 30 with means to effect acceleration of the automobile there is no means of connection to the carburetor as is ordinarily the case with throttle controls, but in lieu of this direct connection to the carburetor the present hand device merely effects operation of the regular foot pedal throttle control which, of course, in turn is connected to the engine carburetor. The present device includes a bracket or plate 44, the lower portion 45 of which is adapted for connection to the foot pedal throttle 14 of the automobile. This attachment takes the form of bolt or rivet members 46. The lower portion 45 is preferably covered with a rubber pad such as ordinarily accompanies foot pedals in automobiles. This rubber covering, shown at 47, provides a good surface for engagement by the operator's foot and prevents slipping off the pedal by the friction gained by the use of the rubber. In other words, the foot pedal of the automobile is substantially retained in its present form and may be continued to be used without hindrance from the hand lever accelerator attachment. The strip or plate member 44 extends upwardly and is bent to substantially follow and lie parallel to the partition 19—27. The upper portion of the plate 44 is designated as 48 and at its upper end carries one portion 49 of a hinge 50. The connection between the upwardly extending member 48 and the hinge arm 49 is accomplished by bolts or rivets or the like 51. Another arm 52 of the hinge 50 is normally positioned at right angles to the arm 49 and carries an elongated sleeve member 53 extending in a horizontal plane rearwardly toward the dash panel 15 of the automobile. A rigid connection is provided between the arm 52 and the sleeve 53 either by welding or riveting. A weld is shown at 54 and this structural portion is shown in detail in enlarged Figure 3 of the drawings.

The rearward end of the sleeve 53 slidably receives the forward end of the link or piston 41. This rod member 41 is reciprocated longitudinally of the automobile by movement of the hand lever 30. The member 41 is provided with a collar 55 which is adjustable along the length of the rod 41. As shown in the present form the rod 41 is threaded and the collar 55 threadedly engages the shank of the member 41 so that it may be positioned at any location along the length thereof. There is no other connection between the member 41 and the elongated sleeve member 53 so that the foot pedal 14 may be depressed and there will be no corresponding movement of the hand lever 30. All that will happen is that the sleeve member 53 will separate from the collar 55. The end 56 of the member 41 is sufficiently long so that it will continue to remain telescoped within the sleeve 53 upon full depression of the regular foot pedal 14. Thus when it is desired to effect operation of the automobile by the hand lever 30 it is pulled forwardly as indicated by the dashed lines in Figure 1 whereupon the collar 55 contacts the end of the sleeve 53 and through the hinge 50 which is shown in detail in Figure 3 depression of the foot pedal 14 is effected. The winged nut 36 may be adjusted so there is a minimum of friction between the lever and the bracket and in such event the hand lever will return to its throttled position without manual movement of the lever. If it is desired the winged nut may be tightened sufficiently so there will be enough friction between the bracket side plates and the flat portion of the lever to retain the hand lever against return movement by action of the accelerator pedal spring, but not so tight as to prevent easy manual adjustment of the hand lever. When lower speeds are desired the hand lever is moved forwardly, and although there is no positive connection between the collar 55 and the sleeve 53 the spring 26 normally returning the foot pedal 14 is sufficiently strong and active to return the linkage mechanism constituting that portion which is attached to the foot pedal 14 and extends upwardly and thence rearwardly to connection with the downward extension 39 of the hand lever 30.

The adjustable collar 55 may, of course, take any form for its adjustment along the length of the rod 41. Adjustment of this collar 55 simultaneously provides adjustment for the relative location of the operative range of the lever 30. This, it should be understood, is optional on the part of the operator. Should the operator want his hand lever to begin operation of the accelerator from its extreme vertical position as shown in full lines in Figure 1, then the collar 55 would have to be in abutting position with the end of the sleeve 53. However, should the operator desire that hand operation would not commence until the hand lever 30 and its operating portion 37 had been moved rearwardly so that it was closely adjacent the periphery of the steering wheel as indicated in either of the dashed line positions of the lever 30 as shown in Figure 1 then the collar 55 would be set spaced from the sleeve 53 such as shown in the dashed line position of the collar in Figure 4. This would provide that the initial movement of the hand lever 37 would be a lost motion movement and would not effect real accelerator operation until such time as the collar 55 contacted the end of the sleeve 53 in abutting engagement and thereby imparted depression movement to the hinged foot pedal 14.

An important advantage of the hand accelerator is realized when starting an automobile on an incline. The hand accelerator operator may be preset or regulated so the engine is running sufficiently fast to give the automobile enough power to travel up the incline immediately upon release of a brake pedal. Without the hand control it was necessary to quickly shift one's foot from the brake to the accelerator and oftentimes the automobile rolled down the incline during this attempted shift. With the hand control the driver has complete and easy control of the automobile in any situation.

Numerous details of construction may be varied throughout a wide range without departing from the principles disclosed herein and I therefore do not propose limiting the patent granted hereon otherwise than as necessitated by the appended claims.

What is claimed is:

1. A hand control accelerator for attachment to the regular foot pedal accelerator of an automobile which has a floor, a partition separating the passenger and engine compartments, an accelerator foot pedal hinged to said floor substantially at said partition and spring held in an upwardly and forwardly inclined position and arranged to accelerate the automobile upon depression thereof, a dash panel spaced above the floor and rearwardly of the partition, comprising a plate fastened to said hinged foot pedal accelerator, said plate having an upward extension substantially following the partition, a hinge carried by the upper end of said plate extension and having a swingable arm extending rearwardly from said plate extension, a sleeve fastened to said hinge arm and projecting rearwardly to a position adjacent to and below the dash panel, a bracket fastened to the dash panel and having horizontally spaced vertical side plates, said side plates having horizontally aligned apertures, a hand lever generally vertically disposed having a hand engaging portion, a flat central apertured portion, and a downwardly extending portion, hinge bolt means passing through the bracket side plate apertures and the hand lever aperture at the flat central portion, nut means engaging said hinge bolt means to vary the frictional engagement of the hand lever and the bracket, said hand lever having a clevis at the lower end of its downwardly extending portion, piston means hingedly attached at one end to said clevis and extending forwardly and telescoping within said sleeve, and means between said piston means and said sleeve for imparting movement from one to the other.

2. A device as set forth in claim 1 in which the last named means comprises a collar adjustably positioned along the length of said piston and adapted to abut the end of said sleeve.

3. A hand control accelerator for attachment to the regular foot pedal accelerator of an automobile which has a floor, a partition separating the passenger and engine compartments, an accelerator foot pedal hinged to said floor substantially at said partition and spring held in an upwardly and forwardly inclined position and arranged to accelerate the automobile upon depression thereof, a dash panel spaced above the floor and rearwardly of the partition, comprising a plate fastened to said hinged foot pedal accelerator, said plate having an upward extension substantially following the partition, a hinge carried by the upper end of said plate extension and having a swingable arm extending rearwardly from said plate extension, a sleeve fastened to said hinge arm and projecting rearwardly to a position adjacent to and below the dash panel, a bracket fastened to the dash panel, said bracket having an aperture therein, a hand lever generally vertically disposed having a hand engaging portion, a central apertured portion, and a downwardly extending portion, hinge means passing through the bracket aperture and the hand lever aperture at the central portion, said hand lever having connecting means at the lower end of its downwardly extending portion, piston means hingedly attached at one end to said connecting means and extending forwardly and telescoping within said sleeve, and means between said piston means and said sleeve for imparting movement from one to the other.

ARCHIE M. SHIPLEY.

REFERENCES CITED

The following references are of record in the file of this patent:

UNITED STATES PATENTS

| Number | Name | Date |
|---|---|---|
| 1,585,855 | Hawn | May 25, 1926 |
| 1,608,992 | Peary | Nov. 30, 1926 |
| 1,801,987 | Strand | Apr. 21, 1931 |
| 1,906,366 | Burns | May 2, 1933 |
| 2,411,500 | Bradley | Nov. 26, 1946 |